US008659610B2

(12) United States Patent
Park

(10) Patent No.: US 8,659,610 B2
(45) Date of Patent: Feb. 25, 2014

(54) LIQUID CRYSTAL DISPLAY AND METHOD OF DRIVING THE SAME

(75) Inventor: Jong Hyon Park, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 1239 days.

(21) Appl. No.: 12/535,790

(22) Filed: Aug. 5, 2009

(65) Prior Publication Data

US 2010/0053183 A1 Mar. 4, 2010

(30) Foreign Application Priority Data

Aug. 29, 2008 (KR) ........................ 10-2008-0085275

(51) Int. Cl.
*G06F 13/00* (2006.01)
*G06T 9/00* (2006.01)

(52) U.S. Cl.
USPC ............................ 345/537; 345/536; 345/555

(58) Field of Classification Search
USPC .................................. 345/530, 536, 537, 555
See application file for complete search history.

(56) References Cited

U.S. PATENT DOCUMENTS 4,530,004 A * 7/1985 Achiha et al. ................. 348/450
6,442,203 B1 * 8/2002 Demos ..................... 375/240.16
7,450,096 B2 * 11/2008 Kwon ............................ 345/87
2006/0098879 A1 * 5/2006 Kim et al. ..................... 382/233

* cited by examiner

*Primary Examiner* — Joni Richer
(74) *Attorney, Agent, or Firm* — Cantor Colburn LLP

(57) ABSTRACT

A liquid crystal display includes a liquid crystal panel and a timing controller. The timing controller includes a first memory unit which sequentially receives a first image signal and a second image signal at a first data rate and outputs the first and second image signals at a second data rate, a second memory unit which compresses and stores the first image signal at the second data rate as a compressed first image signal and outputs the compressed first image signal as a restored first image signal, and an image signal compensation unit which receives the second image signal and the restored first image signal at the second data rate, compensates the second image signal to generate a compensated second image signal using the restored first image signal at the second data rate, and outputs the compensated second image signal at the second data rate to the liquid crystal panel.

18 Claims, 8 Drawing Sheets

LIQUID CRYSTAL DISPLAY AND METHOD OF DRIVING THE SAME

This application claims priority to Korean Patent Application No. 10-2008-0085275, filed on Aug. 29, 2008, and all the benefits accruing therefrom under 35 U.S.C. §119, the contents of which in its entirety are herein incorporated by reference.

BACKGROUND OF THE INVENTION

1. Field of the Invention

The present invention relates to a liquid crystal display and a method of driving the same and, more particularly, to a liquid crystal display having substantially reduced power consumption and/or manufacturing costs, and a method of driving the same.

2. Description of the Related Art

In general, a liquid crystal display ("LCD") includes a liquid crystal panel having a first substrate with a pixel electrode, a second substrate with a common electrode and a liquid crystal layer having dielectric anisotropy disposed between the first substrate and the second substrate.

A display quality of the liquid crystal display is affected by a response speed of liquid crystals in the liquid crystal layer. Accordingly, a driving method for compensating a present image signal, through comparison of the present image signal, of a present frame, with a previous image signal, of a previous frame, has been recently proposed.

To compensate the present image signal using the previous image signal, a memory for storing the previous image signal is required. In addition, the previous image signal is restored after the present image signal is compressed and stored and, as a result, a method of storing a difference between image signals of adjacent pixels, such as a differential pulse code modulation ("DPCM") method, for example, is required, increasing power consumption and/or a manufacturing cost of the liquid crystal display.

BRIEF SUMMARY OF THE INVENTION

The present invention has been made to solve the above-mentioned problems, and an exemplary embodiment of the present invention thereby provides a liquid crystal display having substantially reduced and/or effectively minimized power consumption and manufacturing cost.

An alternative exemplary embodiment of the present invention provides a method of driving a liquid crystal display which substantially reduces and/or effectively minimizes power consumption and/or manufacturing cost of the liquid crystal display.

A liquid crystal display according to an exemplary embodiments of the present invention includes a liquid crystal panel including a plurality of pixels and which displays an image, and a timing controller which controls the liquid crystal panel to display the image thereon. The timing controller includes a first memory unit which sequentially receives and stores a first image signal and a second image signal at a first data rate and outputs the first image signal and the second image signal at a second data rate, a second memory unit which compresses and stores the first image signal as a compressed first image signal at the second data rate and restores and outputs the compressed first image signal as a restored first image signal at the second data rate, and an image signal compensation unit which receives the second image signal at the second data rate and the restored first image signal at the second data rate and which compensates the second image signal as a compensated second image signal at the second data rate using the restored first image signal at the second data rate and outputs the compensated second image signal at the second data rate to the liquid crystal panel.

In an alternative exemplary embodiment of the present invention, there is provided a method of driving a liquid crystal display. The method includes: providing a liquid crystal panel having a plurality of pixels and displaying an image; receiving and storing a first image signal and a second image signal at a first data rate in a first memory unit; outputting the first image signal and the second image signal at a second data rate from the first memory unit; compressing and storing the first image signal as a compressed first image signal at the second data rate in a second memory unit, and then restoring and outputting the compressed first image signal as a restored first image signal at the second data rate; receiving the second image signal at the second data rate and the restored first image signal at the second data rate; and compensating the second image signal as a compensated second image signal at the second data rate using the restored first image signal at the second data rate and outputting the compensated second image signal of the second data rate to the liquid crystal panel.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE INVENTION

Figure 1:
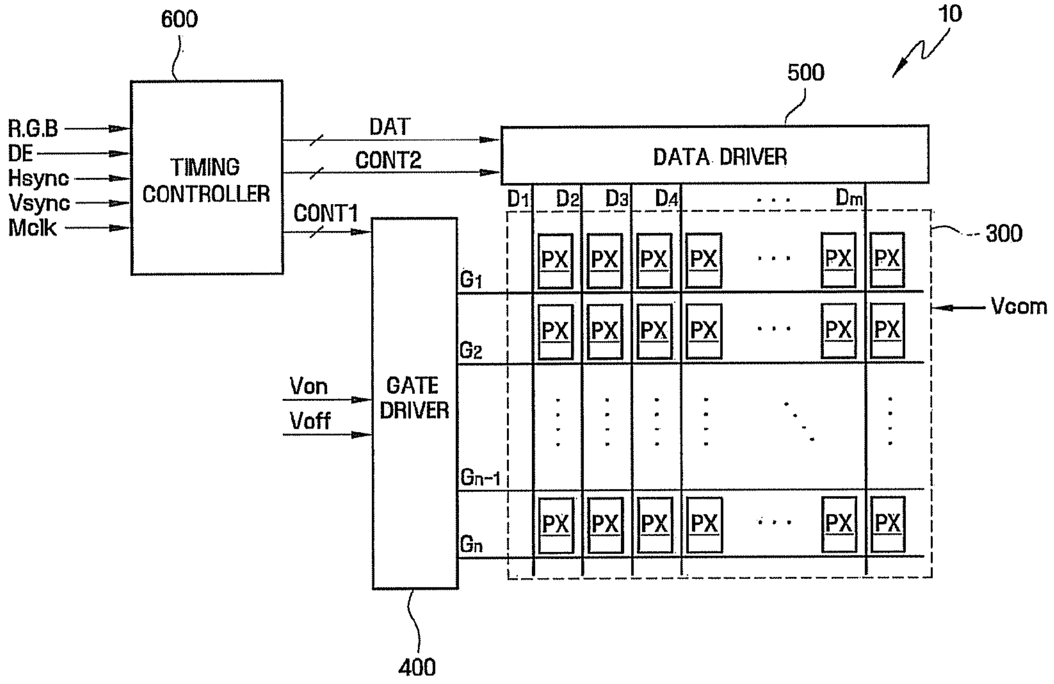
FIG. 1 is a block diagram of an exemplary embodiment of a liquid crystal display according to the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

A liquid crystal display and a method of driving the same according to an exemplary embodiment of the present invention will now be described in further detail with reference to FIGS. 1 to 7.

Figure 2:
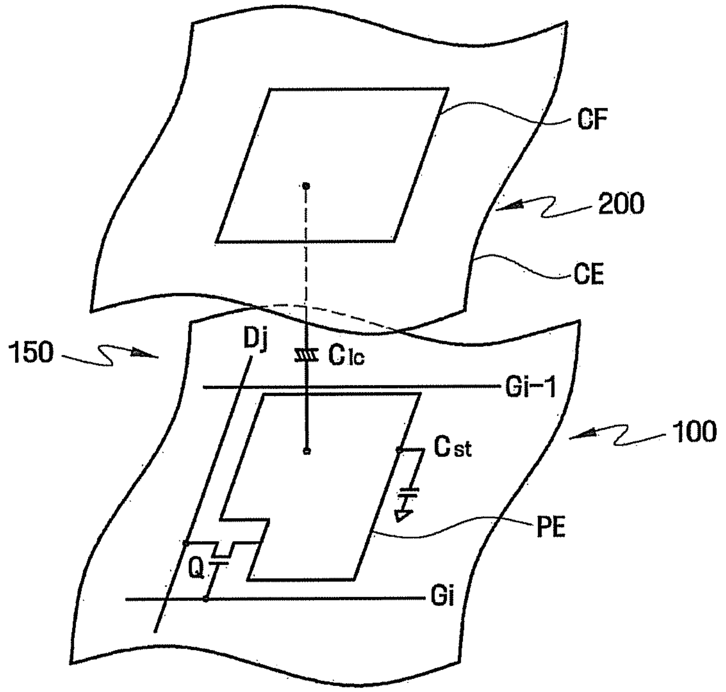
FIG. 2 is an equivalent schematic circuit diagram of an exemplary embodiment of a pixel of the liquid crystal display shown in FIG. 1.
Figure 3:
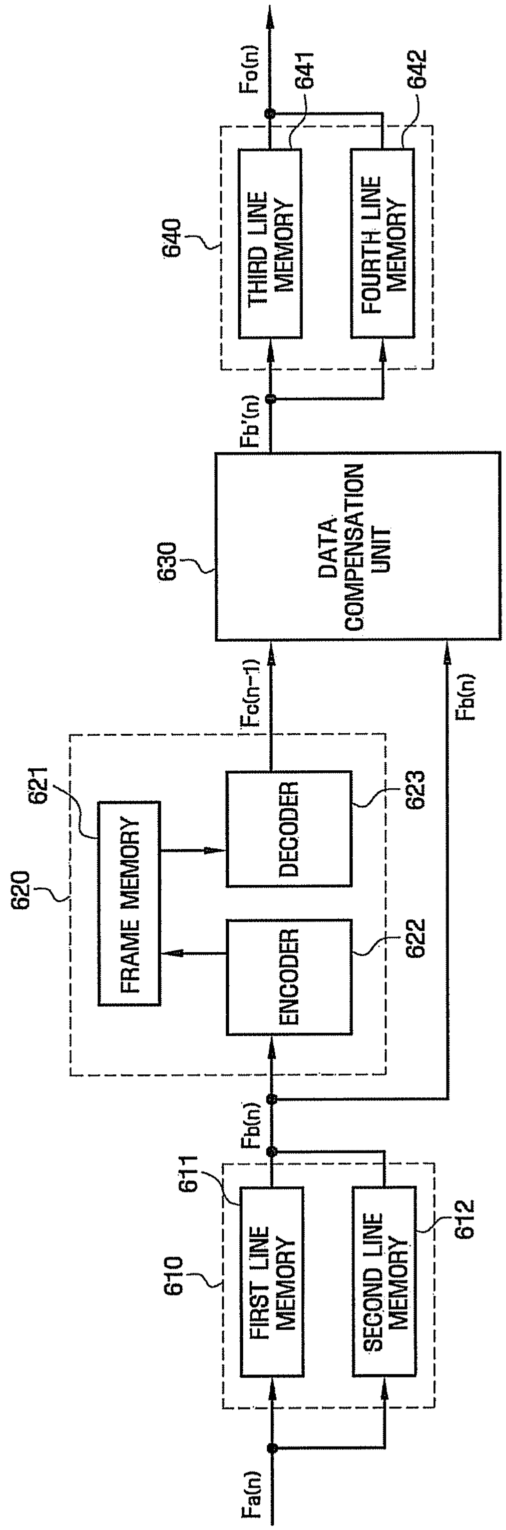
FIG. 3 is a block diagram of an exemplary embodiment of a timing controller of the liquid crystal display shown in FIG. 1.
Figure 4:
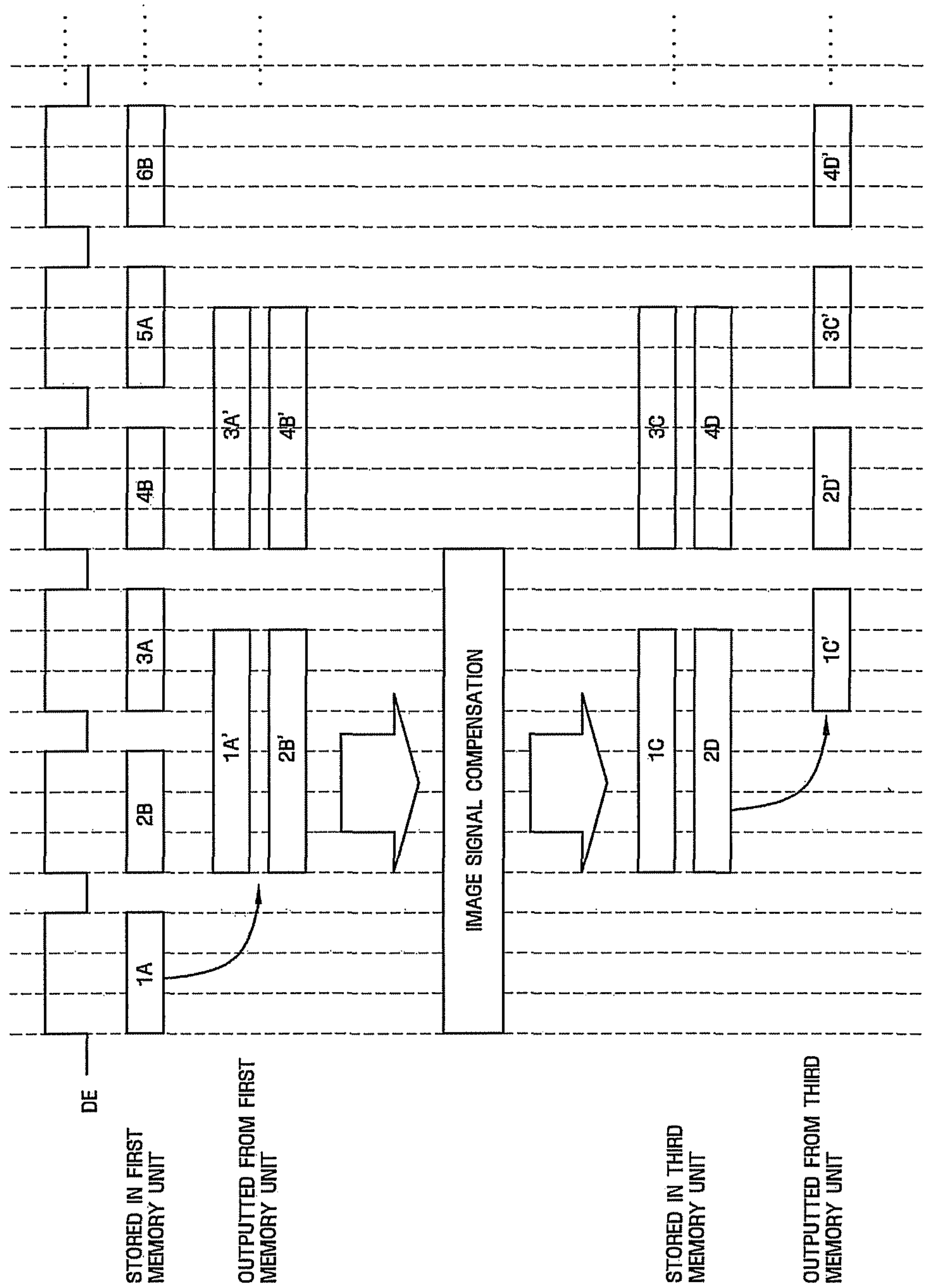
FIG. 4 is a signal timing chart illustrating an exemplary embodiment of an operation of a timing controller of the liquid crystal display shown in FIG. 1.
Figure 5:
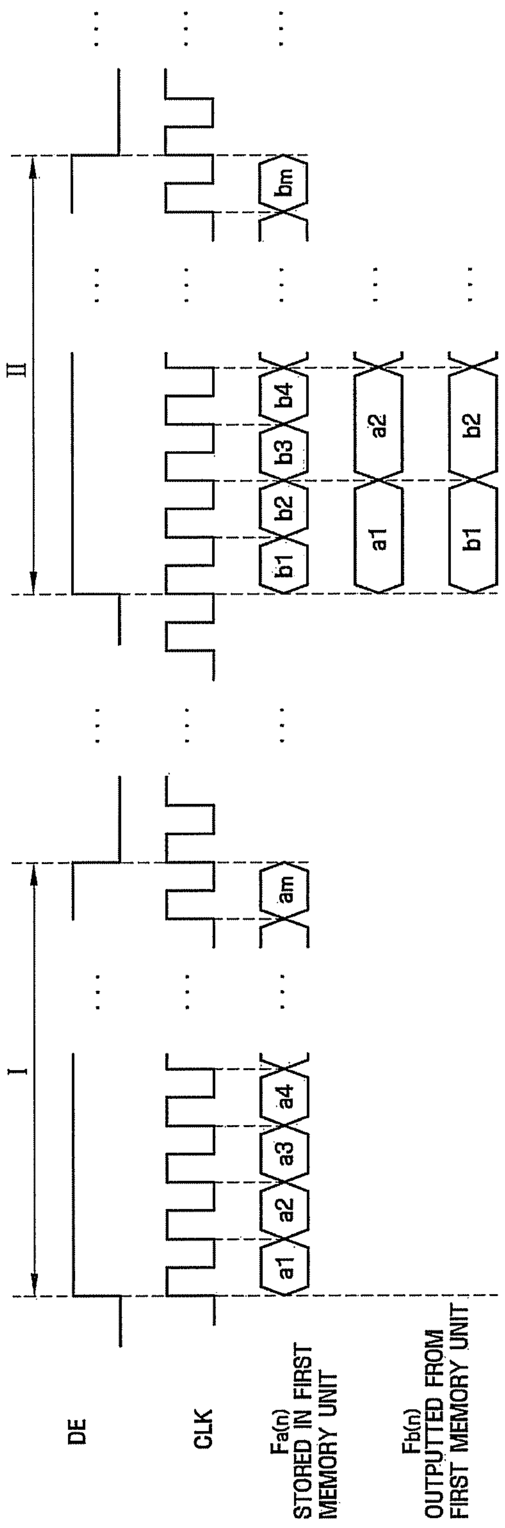
FIG. 5 is a signal timing chart illustrating an exemplary embodiment of an operation of a first memory unit of the timing controller shown in FIG. 3.
Figure 6:
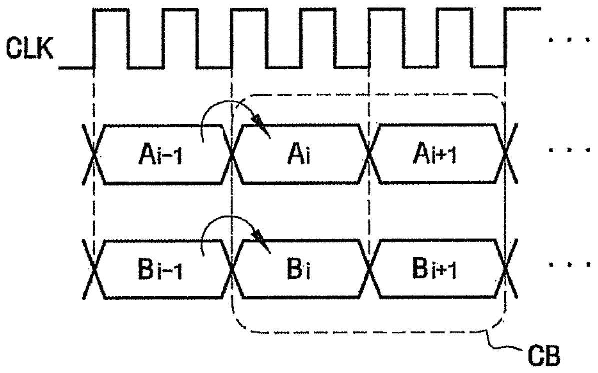
FIG. 6 is a signal timing chart illustrating an exemplary embodiment of an operation of a second memory unit the timing controller shown in FIG. 3.
Figure 7:
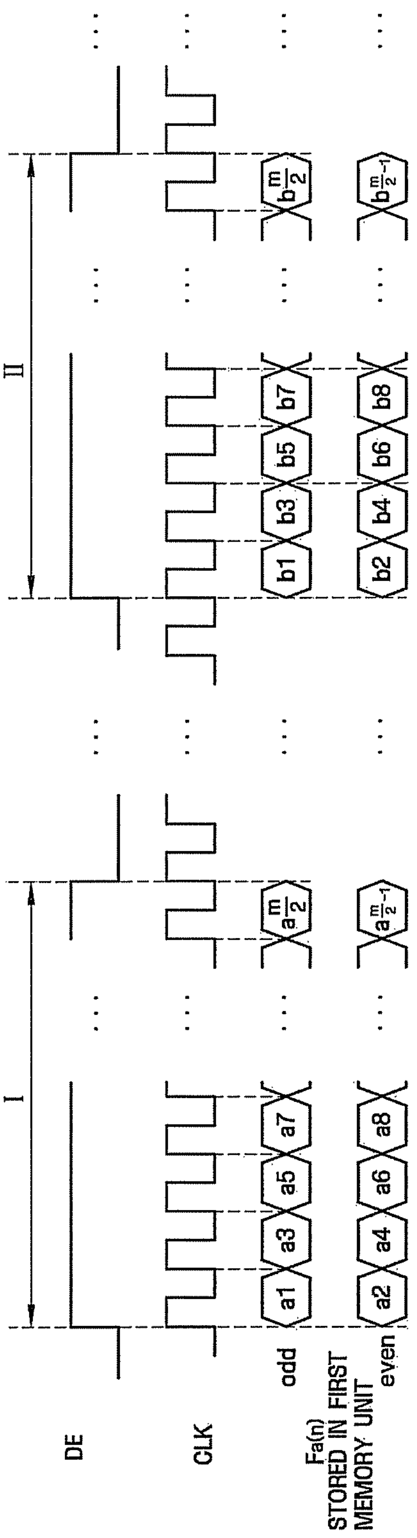
FIG. 7 is a conceptual view explaining another operation of the first memory unit of the timing controller shown in FIG. 3.

FIG. 1 is a block diagram of an exemplary embodiment of a liquid crystal display according to the present invention. FIG. 2 is an exemplary embodiment of an equivalent circuit diagram of one pixel of the liquid crystal display shown in FIG. 1. FIG. 3 is a block diagram of an exemplary embodiment of a timing controller of the liquid crystal display shown in FIG. 1, and FIG. 4 is a signal timing chart illustrating an exemplary embodiment of an operation of a timing controller of the liquid crystal display shown in FIG. 1. FIG. 5 is a signal timing chart illustrating an exemplary embodiment of an operation of a first memory unit of the timing controller shown in FIG. 3, and FIG. 6 is a signal timing chart illustrating an exemplary embodiment of an operation of a second memory unit of the timing controller shown in FIG. 3. FIG. 7 is a signal timing chart illustrating an alternative exemplary embodiment of an operation of the first memory unit of the timing controller shown in FIG. 3.

Referring to FIG. 1, a liquid crystal display 10 according to an exemplary embodiment of the present invention includes a liquid crystal panel 300, a gate driver 400, a data driver 500 and a timing controller 600.

In an equivalent schematic circuit of the liquid crystal display 10, the liquid crystal panel 300 is connected to a plurality of display signal lines G1-Gn and D1-Dm, and includes a plurality of pixels PX arranged in a substantially matrix pattern. The plurality of display signal lines G1-Gn and D1-Dm include a plurality of gate lines G1-Gn for transferring gate signals and a plurality of data lines D1-Dm for transferring data signals. Gate lines G1-Gn of the plurality of gate lines G1-Gn extend in a substantially row direction, and are substantially in parallel to one another. Data lines D1-Dm of the plurality of data lines D1-Dm extend in a substantially column direction, e.g., substantially perpendicular to the gate lines G1-Gn, and are disposed substantially in parallel to one another.

An equivalent schematic circuit of one pixel PX of the plurality of pixels PX is illustrated in FIG. 2. On a portion of a common electrode CE of a second substrate 200, a color filter CF is disposed to substantially face a pixel electrode PE of a first substrate 100. A liquid crystal layer 150 is disposed between the first substrate 100 and the second substrate 200. A common voltage Vcom (FIG. 1) is supplied to the common electrode CE. In an exemplary embodiment, one pixel PX, for example, a pixel PX connected to an i-th (where i=1–n) gate line Gi and a g-th (where j=1–m) data line Dj, includes a switching element Q connected to the i-th gate line Gi and the j-th data line Dj, a liquid crystal capacitor Clc and a storage capacitor Cst connected to the switching element Q.

Referring again to FIG. 1, the timing controller 600 receives an input control signal from an external graphic controller (not shown), and generates a gate control signal CONT1 and a data control signal CONT2 based on the input control signal. The timing controller 600 transmits the gate control signal CONT1 to the gate driver 400, and transmits the data control signal CONT2 to the data driver 500. The input control signal according to an exemplary embodiment includes a vertical sync signal Vsync, a horizontal sync signal Hsync, a main clock MCLK and a data enable signal DE, for example.

The timing controller 600 receives and stores a first image signal Fa(n−1) (FIG. 3) and a second image signal Fa(n), temporally subsequent, e.g., later than the first image signal Fa(n), at a first data rate, and successively outputs a first image signal Fb(n−1) and a second, subsequent, image signal Fb(n) at a second data rate. Then, the timing controller 600 compresses and stores the first image signal Fb(n−1) at the second data rate as a compressed first image signal, and restores and outputs the compressed first image signal as a restored first image signal Fc(n−1) at the second data rate. In addition, the timing controller 600 outputs a compensated image signal Fb'(n), which is obtained, e.g., generated, by compensating the second image signal Fb(n) at the second data rate using the restored first image signal Fc(n−1) at the second data rate, to the liquid crystal panel 300.

As shown in FIG. 1, RGB signals R, G and B are inputted to the timing controller 600. More particularly, the RGB signals are the first and second image signals Fa(n−1) and Fa(n), respectively, inputted to the timing controller 600. Also, the first and second image signals Fa(n−1) and Fa(n), respectively, may be image signals corresponding to images of the previous frame and the present frame, respectively, being successively provided to the timing controller 600. Put another way, the first image signal Fa(n−1) may be an image signal of a previous frame and the second image signal Fa(n) may be an image signal of the present frame temporally subsequent and adjacent to the previous frame.

More specifically, the first image signal Fa(n−1) and the second image signal Fa(n) each include a plurality of line data which correspond to the data lines D1-Dm, and the respective line data includes a plurality of pixel data that correspond to the pixels PX.

An operation of the timing controller 600 will be described in further detail below.

In an exemplary embodiment, the gate control signal CONT1 is a signal for controlling an operation of the gate driver 400, and includes a vertical start signal for starting operation of the gate driver 400, a gate clock signal for determining an output time of a gate-on voltage, an output enable signal for determining a pulse width of the gate-on voltage, but alternative exemplary embodiments are not limited to the foregoing signals. The data control signal CONT2 is a signal for controlling operation of the data driver 500, and includes, for example, a horizontal start signal for starting the operation of the data driver 500 and an output command signal for determining an output data voltage.

The gate driver 400 receives the gate control signal CONT1 from the timing controller 600, and applies the gate signal to the gate lines G1-Gn. In an exemplary embodiment, the gate signal includes a combination of a gate-on voltage Von and a gate-off voltage Voff provided from a gate on/off voltage generator (not shown). As described above, the gate control signal CONT1 is a signal for controlling the operation of the gate driver 400, and includes a vertical start signal for starting the operation of the gate driver 400, a gate clock signal for determining an output time of a gate-on voltage and an output enable signal for determining a pulse width of the gate-on voltage, for example.

The data driver 500 receives the data control signal CONT2 from the timing controller 600, and applies an image data voltage to the data lines D1-Dm. The image data voltage is a grayscale voltage provided from a grayscale voltage generator (not shown), which corresponds to the display image signal. As described above, the data control signal CONT2 is a signal for controlling operation of the data driver 500, and includes a horizontal start signal for starting the operation of the data driver 500 and an output command signal for commanding output of the data voltage, for example.

Referring now to FIG. 3, the timing controller 600 includes a first memory unit 610, a second memory unit 620, a data signal compensation unit 630 and a third memory unit 640.

The first memory unit 610 receives and stores the first and second successive image signals Fa(n−1) and Fa(n), respectively, at the first data rate, and successively outputs the first and second image signals Fb(n−1) and Fb(n), respectively, at the second data rate. In an exemplary embodiment, the first data rate, which is a first data transmission speed, may be greater than the second data rate, which is a second data transmission speed. Moreover, in an exemplary embodiment of the present invention, for example, the first data rate may be approximately twice the second data rate.

More specifically, the first data rate and the second data rate mean an average value of a number of bits, bytes, or blocks, per unit time, for data transmitted between corresponding devices. Moreover, the unit time may be measured in seconds, minutes, or hours depending on circumstances. For example, a number of bits per unit time, for example, the number of bits per second, for the first and second image signals Fa(n−1) and Fa(n), respectively, transmitted between an external device (not shown) and the first memory unit 610 may be the first data rate, and the number of bits per unit time for the first and second image signals Fb(n−1) and Fb(n), respectively, transmitted between the first memory unit 610 and the second memory unit 620 may be the second data rate. In other words, respective data rates mean data transmission speeds between corresponding devices of the present invention.

The first and second image signals Fa(n−1) and Fa(n), respectively, which are provided to the first memory unit 610, include the line data corresponding to the plurality of data lines D1-Dm, and the line data includes a plurality of pixel data corresponding to the plurality of pixels PX. The first memory unit 610 receives and stores the first and second image signals Fa(n−1) and Fa(n), respectively, at the first data rate in units of two line data, and outputs the first and second image signals Fb(n−1) and Fb(n), respectively, at the second data rate in units of two line data. In an exemplary embodiment, the first memory unit 610 includes a first line memory 611 and a second line memory 612 which store the two line data. More specifically, the first line memory 611 stores a first line data (of the two line data), while the second line memory 612 stores a second line data (of the two line data). The first and second image signals Fa(n−1) and Fa(n), respectively, which are provided to the first memory unit 610 and stored in the first line memory 611 and the second line memory 612, will be described in further detail below with reference to FIG. 5.

The second memory unit 620 compresses and stores the first image signal Fa(n−1) at the second data rate, and then restores and outputs a compressed first image signal at the second data rate. More specifically, the second memory unit 620 includes an encoder 622 which compresses the first image signal Fa(n−1) at the second data rate provided from the first memory unit 610, a frame memory 621 which stores the compressed first image signal, and a decoder 623 which restores the compressed first image signal received from the frame memory 621 to the first image signal Fc(n−1) at the second data rate. Since the image signal, which has been compressed using the encoder 622 and the decoder 623 included in the second memory unit 620, is stored, a size of the frame memory 621 according to an exemplary embodiment is substantially reduced. The encoder 622 and the decoder 623 according to an exemplary embodiment may use diverse compression and/or restoration techniques. For example, differential pulse code modulation ("DPCM") may be used in the encoder 622 and/or the decoder 623. The method of processing the first image signal through the second memory unit 620 will be described in further detail below with reference to FIG. 6.

The data signal compensation unit 630 receives the second image signal Fb(n) at the second data rate and the restored first image signal Fc(n−1) at the second data rate, and outputs a compensated image signal Fb'(n), obtained by compensating the second image signal Fb(n) at the second data rate using the restored first image signal Fc(n−1) at the second data rate, to the liquid crystal panel to display a desired image thereon. In an exemplary embodiment, for example, the data signal compensation unit 630 includes an automatic color compensation("ACC") block (not shown) for improving color characteristics, and a dynamic capacitance compensation("DCC") block (not shown) for improving a response speed of liquid crystals in the liquid crystal layer 150 (FIG. 2). The ACC and the DCC methods are well known in the field to which the present invention pertains, and a detailed description thereof will therefore be omitted.

The timing controller 600 according to an exemplary embodiment further includes a third memory unit 640 which receives and stores the second compensated image signal Fb'(n) at the second data rate, and then outputs the stored second image signal to the liquid crystal panel 300 at the first data rate. More specifically, the third memory unit 640 receives and stores the second compensated image signal Fb'(n) at the second data rate and in units of two line data. Then, the third memory unit 640 outputs the second compensated image signal Fo(n) at the second data rate and in units of two line data. In a similar manner as with the first or second memory unit 610 or 620, respectively, the third memory unit 640 includes third and fourth line memories 641 and 642, respectively, which store the two line data.

Referring now to FIG. 4, an operation of the timing controller 600 which controls the liquid crystal panel 300 to display an image thereon will be described in further detail.

While the data enable signal DE is kept at a first level, e.g. at a high level, the first and second image signals Fa(n−1) and Fa(n) (hereinafter, "the image signals") at the first data rate are inputted to and stored in the first memory unit 610. Specifically, the first memory unit 610 receives the image signals at the first data rate in units of two line data, and stores the received image signals in the first line memory 611 and the second line memory 612. In FIG. 4, a rectangle indicates that the image signals are stored in the respective line memories. For example, a rectangle labeled "1A" indicates that the first line data is stored in the first line memory 611, whereas "2B" indicates that the second line data is stored in the second line memory 612 and "3A" indicates that the third line data is stored in the first line memory 611. Put another way, natural numbers at the beginning of the labels "A" and "B" in FIG. 4 indicate line data of the image signal corresponding to the data lines, and "A" and "B" indicate whether the first or second line data are stored in first line memory 611 and the second line memory 612, respectively.

Then, first line memory 611 and the second line memory 612 output the first and second line data at the second data rate. As shown in FIG. 4, the first line memory 611 and the second line memory 612 store the first and second line data at the first data rate, and output the first and second line data at the second data rate. In FIG. 4, "A'" and "B'" indicate that the first and second line data are being outputted from first line memory 611 and the second line memory 612, respectively, as described above. In this case, as illustrated in FIG. 4, the second data rate is approximately ½ of the first data rate. Specifically, to compress/restore the image signals, the image signals pass through logic gates, and a reliability of the image signal is substantially improved in an exemplary embodiment by performing a compression/restoration of the image signal at a relatively low data rate, e.g., at the second data rate, as shown in FIG. 4.

The first and second line data outputted from first line memory 611 and the second line memory 612 are transmitted to the second memory unit 620 and the data signal compensation unit 630. The first and second line data transmitted to the second memory unit 620 are compressed by the encoder 622, stored in the frame memory 621, and are then restored through the decoder 623 to be transmitted to the data signal compensation unit 630. More specifically, the first and second line data stored in the frame memory 621 are stored for one frame, and are then restored for a next, e.g., subsequent and adjacent, frame. Thus, the first and second image signals successively provided, as described above, mean the image signals corresponding to the previous frame and the present frame, respectively.

The first and second line data transmitted to the data signal compensation unit 630 are data corresponding to the present frame, and are compensated by the first image signal Fa(n−1) restored through the decoder 623, e.g., the first and second line data of the previous frame.

The second image signal compensated by the first image signal Fc(n−1), e.g., the first and second line data of the compensated image signal, are stored in the third memory unit 640. As described in greater detail above, the third memory unit 640 includes the third line memory 641 and the fourth line memory 642, and the first and second line data of the compensated image signal, provided at the second data rate, are stored in the third line memory 641 and the fourth line memory 642, respectively.

Similar to as described above with respect to the first and second line memories 611 and 612, respectively, natural numbers inscribed at the head of labels "C" and "D" in FIG. 4 indicate the line data of the image signal corresponding to the data lines, where "C" and "D" mean the first and second line data being stored in the third line memory 641 and the fourth line memory 642, respectively. "C'" and "D'" mean the third and fourth line data being outputted from the first line memory 611 and the second line memory 612. In other words, the first and second line data of the compensated image signal obtained by compensating the second image signal using the first image signal are stored in the third line memory 641 and the fourth line memory 642, and the compensated image signal is provided to the third memory unit 640 including the third line memory 641 and the fourth line memory 642 at the second data rate. The third line memory 641 and the fourth line memory 642 of the third memory unit 640 output the first and second line data at the second data rate, which in an exemplary embodiment may be about ½ of the first data rate.

In an exemplary embodiment, the first memory unit 610 receives and stores a plurality of the line data in a similar manner as it stores the successive first and second line data 1A, 2B, 3A, 4B, 5A, 6B, . . . at the first data rate in the first and second line memories 611 and 612, respectively, and outputs the first and second line data 1A', 2B', 3A', 4B', . . . from the first line memory 611 and the second line memory 612 at the second data rate, is lower than the first data rate. Then, the first memory unit 610 compensates the first and second line data of the second data rate using the first image signal Fa(n), stores the first and second compensated line data IC, 2D, 3C, 4D, . . .

in the third memory unit 640, e.g., the third line memory 641 and the fourth line memory 642, respectively, and outputs the first and second line data IC', 2D', 3C', 4D', . . . from the third line memory 641 and the fourth line memory 642 at the first data rate. Thus, the first and second line data outputted from the third memory unit 640 have substantially the same data rate as the first and second line data provided to the first memory unit 610, and are provided to the liquid crystal panel 300 as the compensated image signal Fb'(n) to display the image on the liquid crystal panel 300.

Referring now to FIG. 5, operation of the first memory unit 610 will be described in further detail. When the data enable signal DE is at a high level (e.g. in periods I and II), line data of the image signals are successively provided. As shown in FIG. 5, pixel data a1-am and b1-bm of respective line data are provided to the first memory unit 610 based on levels of the data enable signal DE and the clock signal CLK. Specifically, the pixel data a1-am and b1-bm are provided at rising edges of the clock signal CLK. In this case, the providing of the respective pixel data at each rising edge of the clock signal is at the first data rate.

In contrast, in a case of outputting the pixel data a1-am and b1-bm, the first and second memory units 610 and 620, respectively, may output one pixel data every two rising edges of the clock signal, e.g., at the second data rate. Accordingly, the first memory unit 610 receives the image signal at the first data rate, where one pixel data is transmitted for each rising edge of the clock signal, and outputs the image signal at the second data rate, where one pixel data is transmitted every two rising edges of the clock signal. Further, through the first and second line memories 611 and 612, respectively, the first line data can be outputted simultaneously with the second line data. In other words, the first and second line data are temporally aligned with each other, as shown in FIG. 5.

Referring now to FIG. 6, an operation of the second memory unit 620 and, more particularly, the encoder 622, will be described in further detail. As described above, the encoder 622 compresses the first image signal Fa(n−1) at the second data rate provided from the first memory unit 610. The first and second line data of the first image signal Fa(n−1) provided from the first memory unit 610 form a plurality of compressed blocks CB. Specifically, adjacent pixel data of the first and second line data, which have been aligned using the first and second line memories 611 and 612, respectively, form the compressed blocks CB, and the image signal compression is performed in units of compressed blocks CB. As illustrated in FIG. 6, in the first and second line data aligned (as described in greater detail above) pixel data a_i and b_i of the first and second line data, respectively, and adjacent pixel data a_i+1 and b_i+1, respectively, which are adjacent to the pixel data in a given direction, form one compressed block CB. Although a 2×2 compressed block is illustrated in FIG. 6, a size and/or type of compressed block CB is not limited thereto, and the compressed block CB may be formed in various ways in alternative exemplary embodiments of the present invention.

Further, in compressing the pixel data included in the respective compressed blocks CB, the adjacent pixel data may be used as a reference value. For example, in a case of compressing the pixel data a_1, A_i+1, b_i, and b_i+1 included in the compressed block CB shown in FIG. 6, the pixel data a_i-I and b_i-I adjacently arranged in a substantially horizontal direction in the same line data may be used as reference values. Thus, the data values in the substantially horizontal direction is used in compressing the pixel data in an exemplary embodiment. However, alternative exemplary embodiments are not limited thereto, and data compression may also be performed with reference to pixel data in a substantially vertical direction in a compressed block CB, or, alternatively, in a substantially diagonal direction. Thus, reference values can be adopted using various methods in accordance with a compression type of a given alternative exemplary embodiment of the present invention.

Referring now to FIG. 7, an alternative exemplary embodiment of an operation of the first memory unit 610 will be described in further detail. In an exemplary embodiment of the present invention in which a liquid crystal display has a high resolution, e.g. a full high definition ("HD") resolution, an amount of data of the image signal is increased (relative to the exemplary embodiment of the present invention described above with reference to FIGS. 1-6), and thus respective line data are divided into a plurality of groups to be transmitted individually. More specifically, the pixel data included in associated line data are divided into even pixel data, corresponding to even-numbered pixels and odd pixel data, corresponding to odd-numbered pixels. Moreover, the even pixel data and the odd pixel data are dividedly stored in the first memory unit 610. Thus, as illustrated in FIG. 6, the first memory unit 610 dividedly stores odd pixel data a1, a3, a5, . . . , am/2, b1, b3, b5, . . . , and bm/2, and even pixel data a2, a4, a6, . . . , a(m/2)−1, b2, b4, b6, . . . , and b(m/2)−1.

In an exemplary embodiment, the second memory unit 620 receives at least one odd and one even pixel data of the first and second line data, and forms the compressed blocks CB. More specifically, the second memory unit 620 according to an exemplary embodiment receives the first and second line data, compresses and stores the first image signal Fa(n−1) by successively forming first and second compressed blocks, and then restores the first and second line data in units of first and second compressed blocks. In this case, the restoration of the first compressed block may be completed before the second compressed block is restored, but alternative exemplary embodiments are not limited thereto.

Thus, according to an exemplary embodiment of the liquid crystal display and the method of driving the same according to the present invention, a present image signal at a second data rate, which is outputted from a first memory unit, is compensated using a previous image signal at the second data rate and restored by a second memory unit, and thus a process of rearranging the previous image signal and the present image signal can be omitted. Accordingly, a required memory capacity is substantially reduced, and an increase of power consumption and manufacturing costs can be substantially reduced and/or effectively minimized.

Figure 8:
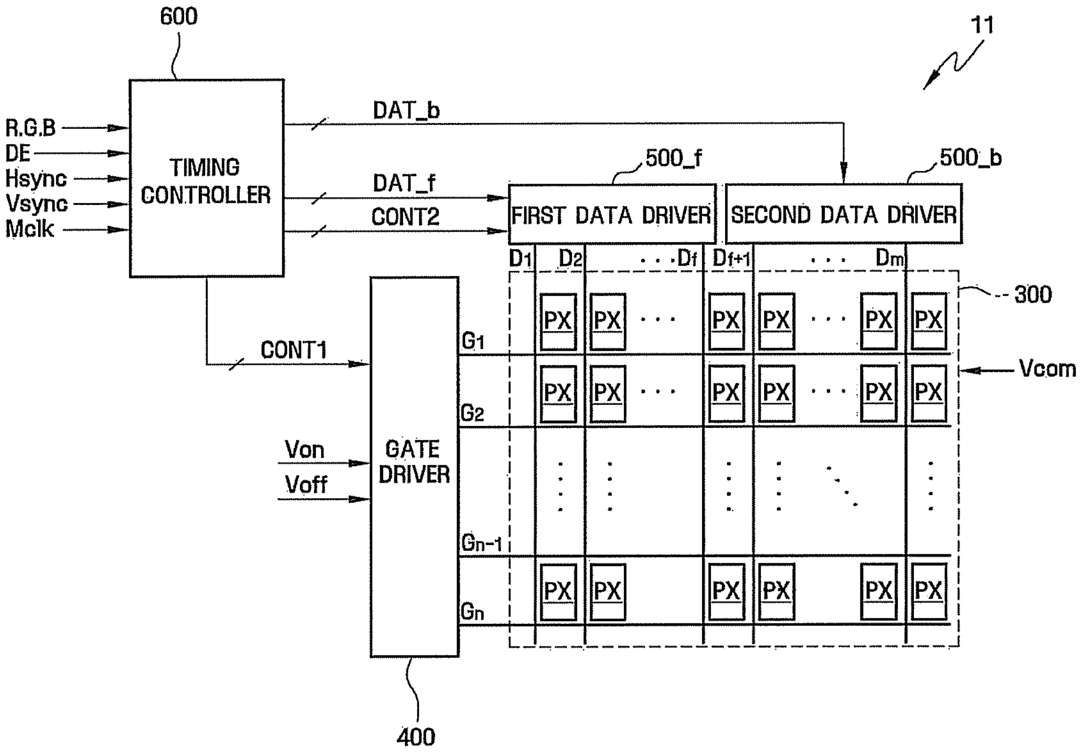
FIG. 8 is a block diagram of an alternative exemplary embodiment of a liquid crystal display according to the present invention.

Hereinafter, a liquid crystal display and a method of driving the same according to an alternative embodiment of the present invention will be described in further detail with reference to FIG. 8. FIG. 8 is a block diagram of an alternative exemplary embodiment of a liquid crystal display according to the present invention.

Unlike the liquid crystal display 10 according to the embodiment of the present invention shown in FIG. 1, a liquid crystal display 11 according to an alternative exemplary embodiment of the present invention includes a liquid crystal panel 300 which is divided into two or more regions, and image signals are distributed to data drivers corresponding to respective regions of the two or more regions.

Specifically, referring to FIG. 8, the liquid crystal display 11 according to an alternative exemplary embodiment of the present invention includes image signals DAT_f and DAT_b provided to a first data driver 500_*f* and a second data driver 500_*b*. As shown in FIG. 8, the data driver 500 is divided into the first and second data drivers 500_*f* and 500_*b*, respectively. However, division of the data driver 500 is not limited thereto in alternative exemplary embodiments, and may differ in accordance with the characteristics of the liquid crystal display 11 according to the same.

Still referring to FIG. 8, a plurality of data lines $D_1$-$D_m$ are divided into a first region and a second region which correspond to a front portion and a rear portion thereof, respectively, and thus the first data driver 500_*f* controls the data lines of the first region, e.g., data lines $D_1$-$D_f$, while the second data driver 500_*b* controls data lines $D_{f-1}$-$D_m$ of the second region. Thus, the respective image signal is divided into a front-end image signal DAT_*f* and a rear-end image signal DAT_*b*, and the front-end image signal DAT_*f* and the rear-end image signal DAT_*b* are thereafter transferred to the data lines $D_1$-$D_m$ of the first and second regions such that the front-end image signal DAT_*f* is transmitted to the first data driver 500_*f* and the rear-end image signal DAT_*b* is transmitted to the second data driver 500_*b*.

According to exemplary embodiments of the present invention as described herein, a liquid crystal display and a method of driving the same provide advantages which include, but are not limited to, a substantially reduced and/or effectively minimized power consumption and manufacturing costs through a substantially reduction of memory capacity. In addition, a display quality is substantially improved, even in a high-resolution liquid crystal display according to an exemplary embodiment.

The present invention should not be construed as being limited to the exemplary embodiments set forth herein. Rather, these exemplary embodiments are provided so that this disclosure will be thorough and complete and will fully convey the concept of the present invention to those skilled in the art.

Although the present invention has been particularly shown and described with reference to exemplary embodiments thereof, it will be understood by those of ordinary skill in the art that various modifications, additions and substitutions may be made therein without departing from the scope or spirit of the present invention as defined by the following claims.

What is claimed is:

1. A liquid crystal display comprising:

a liquid crystal panel including a plurality of pixels and which displays an image; and a timing controller which controls the liquid crystal panel to display the image thereon, the timing controller including:

a first memory unit which sequentially receives and stores a first image signal and a second image signal at a first data rate, and outputs the first image signal and the second image signal at a second data rate;

a second memory unit which compresses and stores the first image signal at the second data rate to generate a compressed first image signal, and restores and outputs the compressed first image signal at the second data rate as a restored first image signal; and a data signal compensation unit which receives the second image signal at the second data rate and the restored first image signal at the second data rate, compensates the second image signal at the second data rate by using the restored first image signal at the second data rate to generate a compensated second image signal, and outputs the compensated second image signal at the second data rate to the liquid crystal panel, wherein the timing controller further comprises a third memory unit which receives and stores the second compensated image signal at the second data rate, and outputs the second image signal to the liquid crystal panel at the first data rate.

2. The liquid crystal display of claim 1, wherein the first data rate is greater than the second data rate.

3. The liquid crystal display of claim 2, wherein the first data rate is two times greater than the second data rate.

4. The liquid crystal display of claim 1, wherein the second memory unit comprises:

an encoder which compresses the first image signal provided from the first memory unit at the second data rate;

a frame memory which stores the first compressed image signal; and a decoder which receives the first compressed image signal from the frame memory and restores the first compressed image signal to the first image signal at the second data rate.

5. The liquid crystal display of claim 1, wherein pixels of the plurality of pixels are connected to data lines and gate lines, the first image signal and the second image signal comprise line data corresponding to the data lines, and the line data comprise pixel data corresponding to pixels of the plurality of pixels.

6. The liquid crystal display of claim 5, wherein the first memory unit receives and stores the first image signal and the second image signal in units of two line data, and the first memory unit outputs the first image signal and the second image signal at the second data rate in units of two line data.

7. The liquid crystal display of claim 6, wherein the pixel data comprise even pixel data, corresponding to even-numbered pixels, and odd pixel data, corresponding to odd-numbered pixels, and the first memory unit receives and stores the even pixel data and the odd pixel data.

8. The liquid crystal display of claim 7, wherein the second memory unit receives at least one odd pixel data and at least one even pixel data of a first line data and a second line data, and forms a first compressed block and a second compressed block, respectively, based on the at least one odd pixel data and the at least one even pixel data of the first line data and the second line data.

9. The liquid crystal display of claim 8, wherein the second memory unit receives the first line data and the second line data, compresses and stores the first image signal by forming the first compressed block and the second compressed block, and then restores the first line data and the second line data of the first compressed block and the second compressed block, wherein a restoration of the first compressed block is completed before a restoration of the second compressed block.

10. The liquid crystal display of claim 6, wherein the first memory unit comprises a first line memory and a second line memory which store the first line data and the second line data, respectively.

11. The liquid crystal display of claim 1, wherein the third memory unit receives and stores the second compensated image signal in units of two line data, and the third memory unit outputs the second compensated image signal at the second data rate in units of two line data.

12. The liquid crystal display of claim 11, wherein the third memory unit comprises a third line memory and a fourth line memory which store the two line data.

13. A method of driving a liquid crystal display, the method comprising:

providing a liquid crystal panel having a plurality of pixels and displaying an image;

receiving and storing a first image signal and a second image signal, subsequent to the first image signal, at a first data rate in a first memory unit;

outputting the first image signal and then the second image signal at a second data rate from the first memory unit;

compressing and storing the first image signal as a compressed first image signal at the second data rate in a second memory unit, and then restoring and outputting the compressed first image signal as a restored first image signal at the second data rate;

receiving the second image signal at the second data rate and the restored first image signal at the second data rate; and compensating the second image signal as a compensated second image signal at the second data rate using the restored first image signal at the second data rate, and outputting the compensated second image signal at the second data rate to the liquid crystal panel, before the compensating and the outputting the second image signal at the second data rate to the liquid crystal panel:

receiving and storing the second compensated image signal at the second data rate in a third memory unit; and outputting the second image to the liquid crystal panel at the first data rate.

14. The method of claim 13, wherein the first data rate is greater than the second data rate.

15. The method of claim 13, wherein pixels of the plurality of pixels are connected to data lines and gate lines, the first image signal and the second image signal comprise line data corresponding to the data lines, and the line data include pixel data corresponding to the pixels.

16. The method of claim 15, wherein the first memory unit receives and stores the first image signal and the second image signal in units of two line data, and the first memory unit outputs the first image signal and the second image signal comprise in units of two line data.

17. The method of claim 16, further comprising dividing the pixel data into even pixel data, corresponding to even-numbered pixels, and odd pixel data, corresponding to odd-numbered pixels, wherein the first memory unit receives and stores the even pixel data and the odd pixel data.

18. The method of claim 16, wherein the first memory unit comprises a first line memory and a second line memory storing the two line data.

* * * * *